INVENTOR.
HENRY L. BACHOFER

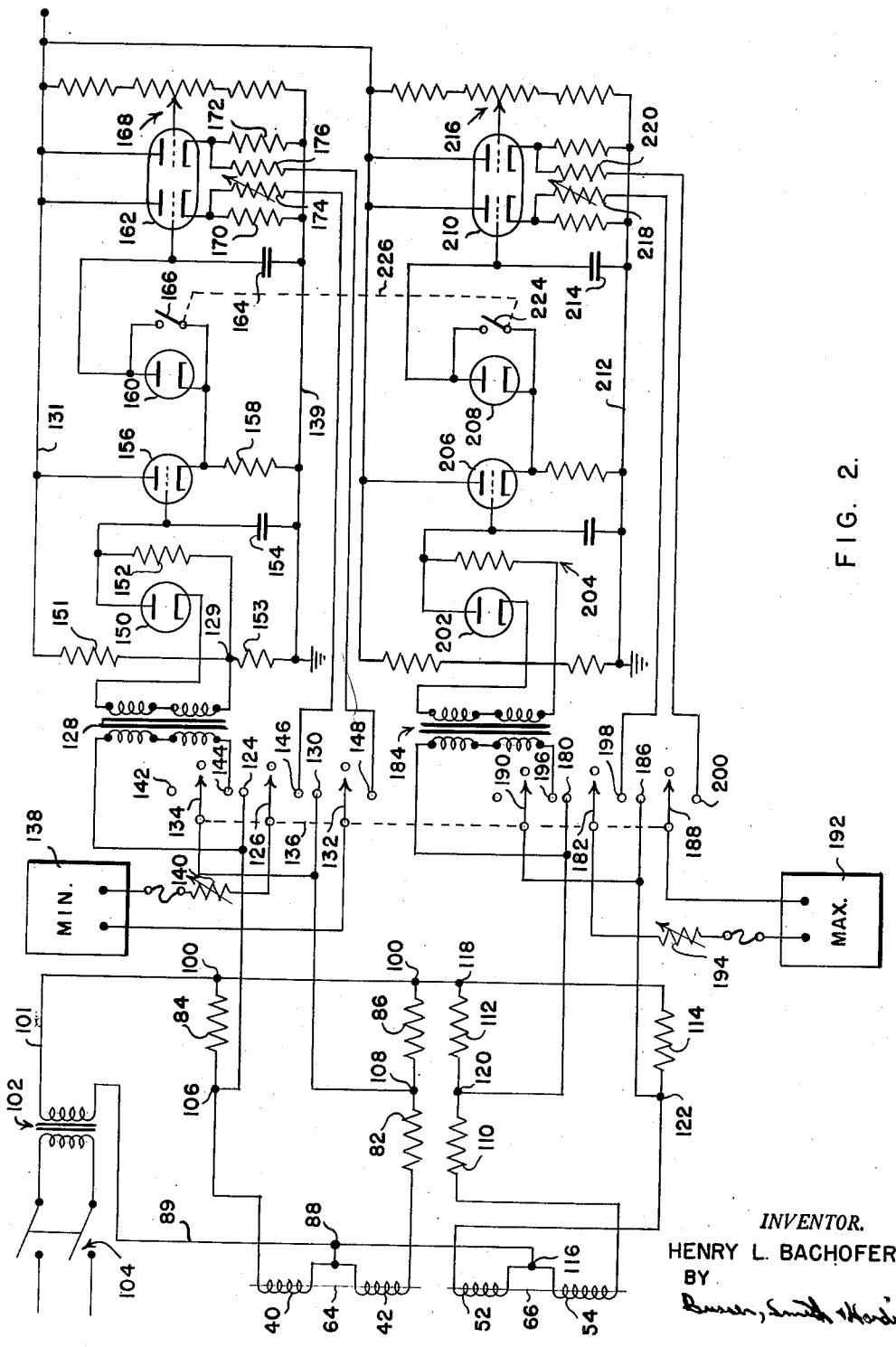

United States Patent Office 2,810,203
Patented Oct. 22, 1957

2,810,203

TUBE CALIPERING DEVICE

Henry L. Bachofer, Springfield, Pa., assignor to Sun Oil Company, Philadelphia, Pa., a corporation of New Jersey Application August 6, 1954, Serial No. 448,269

7 Claims. (Cl. 33—178)

This invention relates to tube calipering and, more particularly, to improved means for measuring internal diameters of a tube when such diameters vary as a result of irregularities in the inside surface of the wall of the tube.

The invention is an improvement of the devices shown in the patents to I. S. Roberts No. 2,235,533, issued March 18, 1941, and No. 2,616,183, issued November 4, 1952.

The tube calipering devices disclosed in the above mentioned patents each includes a measuring head mounting sensing means. When the head is drawn through a tube being calipered, the sensing means are responsive to variations in the inside diameter of the tube. The devices each also includes an indicating means responsive to the sensing means for indicating changes in tube diameter. Inasmuch as variations in tube diameter are frequently due to pitting and similar conditions giving rise to diameter changes extending over relatively short longitudinal lengths of the tube, the indicating means must be watched very closely while the sensing means are drawn extremely slowly through the tube being calipered or diameter changes of short longitudinal length will escape detection.

It is an object of this invention to provide means responsive to sensing means for indicating maximum and minimum diameter points in the inside wall of a tube being calipered and for holding these indications after the sensing means has moved past the portion of the tube sensed giving rise to the maximum or minimum indications. This apparatus permits the relatively rapid movement of the sensing means through the tube and provides indications which are readily observable by an operator.

It is a further object of the invention to provide in combination means for holding indications of sensed minimum and maximum diameters and means providing instantaneous indications of sensed minimum and maximum diameters.

In the operation of the device when the sensing means which is being drawn fairly rapidly through a tube being calipered passes a high or low spot in the tube wall, the sensing means responds to the change in the inside diameter of the tube and the indicating means holds its indication of the variation in diameter sufficiently long for the operator to observe the indication even though the sensing means has moved beyond the point of variation in diameter. It will be evident that upon observing indication of a change in diameter it is merely necessary for the operator to move the sensing means employing instantaneous indicating means backwardly through the pipe at a slow rate until the exact point of the discontinuity is determined whereupon accurate measurements of the location and of the degree of the discontinuity can be made.

These and other objects of the invention will become apparent from the following description when read in conjunction with the accompanying drawings, in which:

Figure 2 is a wiring diagram showing the indicating means and the electrical circuit associated therewith.

Figure 1:
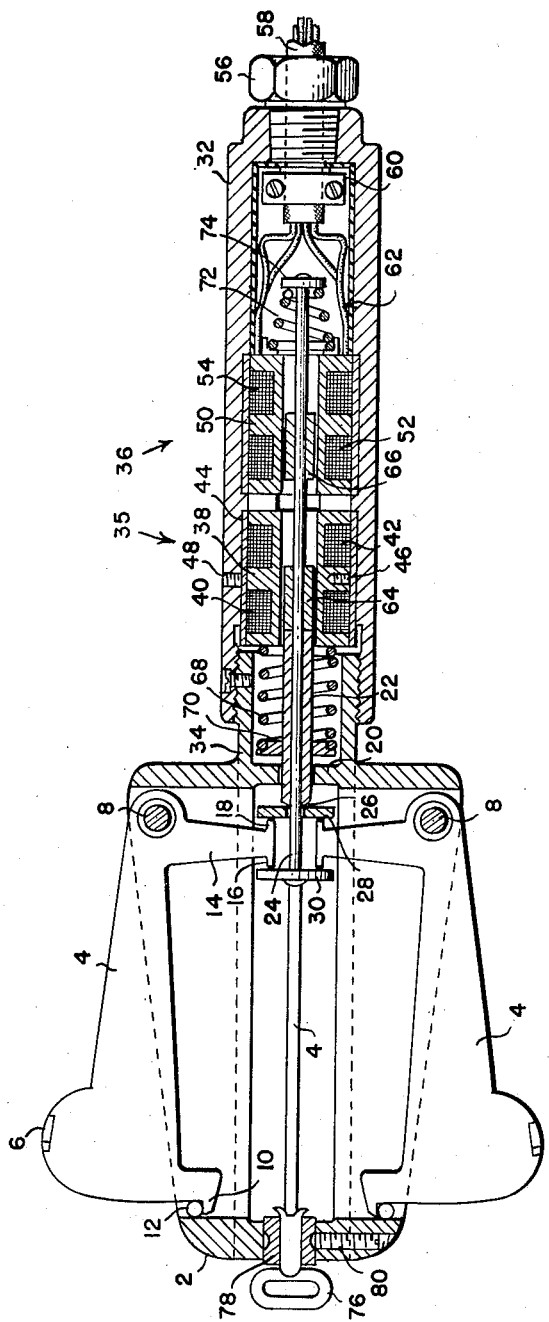
Figure 1 is an elevation partly in section showing the measuring head.

The calipering head shown in Figure 1 includes a housing 2 of generally cylindrical shape within which there is mounted a plurality of caliper fingers 4. While the drawing shows an arrangement employing four calipering fingers, generally a greater number of calipering fingers will be employed, preferably twelve in order to more completely cover the internal surface of the tube being calipered. Each of the calipering fingers includes an extended portion 6 adapted to bear against the inside wall of the tube being calipered. Each of the caliper fingers is pivotally mounted on a pin 8 extending through the housing 2 and positioning hte fingers for movement in a plane extending through the longitudinal axis of the measuring head. Each caliper finger is provided at its left-hand end, as viewed in Figure 1, with an extended portion 10 adapted to engage a stop 12 mounted in the housing 2 in order to limit the outward movement of the caliper fingers. Each caliper finger also includes an inwardly extending portion 14 provided at its innermost end with opposed projections 16 and 18 extending in alignment with the longitudinal axis of the measuring head.

The housing 2, the caliper fingers 4 and the pins 8 and 12 are preferably formed of non-magnetic material such as brass, aluminum and stainless steel. The contact surface 6 of the caliper finger and the tips of the projections 16 and 18 are preferably provided with a surface coating of suitable wear resistant material.

The housing 2 is provided with a transversely extending guide plate 20 positioned to the right of the inwardly extending portion 14 of the caliper fingers as viewed in Figure 1. A sleeve 22 having a rod 24 slidably positioned therein passes through and in sliding engagement with the guide wall 20. The left-hand end portion of the tube 22, as viewed in Figure 1, is provided with a rounded end surface 26 which is preferably coated with a suitable wear resistant material. The sleeve 22 and the rod 24 are formed of a non-magnetic material. A disc 28 is positioned against the end 26 of the sleeve 22 and is adapted to engage the projections 18 of the caliper fingers.

The rod 24 extends with clearance through the disc 28 serving to maintain the disc in position in alignment with the end of the sleeve 22 but permitting the disc to wobble on the rounded end of the sleeve 22. The left-hand end of the rod 24, as viewed in Figure 1, has rigidly affixed thereto a disc 30 adapted to be engaged by the projections 16 of the caliper fingers.

The left-hand end portion of a cylindrical housing 32 is threaded onto an extension 34 of the right-hand end portion of the housing 2, as viewed in Figure 1. This screw connection between the housings 2 and 32 provides convenient longitudinal adjustment between the two housings as will be hereinafter described. Within the housing 32 there are positioned two coil units indicated generally at 35 and 36 in Figure 1.

The coil unit 35 includes a spool form 38 preferably of insulating material having two adjacent slots in its external surface within which there are positioned two coils of wire 40 and 42. The coils are connected in series and taps from the coils taken for connection into the electrical circuit as indicated in Figure 2 which will be hereinafter described. The spool form 38 with its coils is preferably covered with a shell 44 of steel tubing which is secured to the spool form by means of a screw 46 or other suitable means. This shell not only serves as a mechanical protection to the windings but also as a magnetic shield to protect the fields of the coils from extraneous influences. The coil unit is held in place within the housing 32 by means of a set screw 48.

The coil unit 36 is of identical construction to the coil unit 34 and includes a spool form 50 within which there are mounted two coils 52 and 54. These coils are also connected in series and are connected into the circuit as shown in Figure 2 which will be hereinafter described.

At the extreme right-hand end of the housing 32 a strain relief fitting 56 receives a cable 58 which extends through the fitting and through a conventional cable clamp 60 mounted within the housing 32. The individual conductors of the cable 58 as indicated generally at 62 in Figure 1 are connected to the coils 40, 42, 52 and 54. The clamp 60 and the fitting 56 serve to hold the cable 58 and prevent any strain from being imposed on the individual conductors 62.

The coil spool 38 is formed with a central bore within which there is slidably mounted an armature 64. The spool 50 is provided with a central bore in which there is slidably mounted an armature 66. These two armatures are formed of a magnetic material such as annealed mild steel. Each of the armatures 64 and 66 is of shorter length than the overall length of the two coils mounted in its associated spool. Thus movement of either of the armatures in either direction within its spool will vary the magnetic characteristics of the field circuits of the two coils with which it is associated.

The armature 64 is connected to the right-hand end of the sleeve 22. The armature 66 is connected to the right-hand end portion of the rod 24. A helical compression spring 68 is mounted within the housing 32 between the left-hand end of the spool 38, as viewed in Figure 1, and a disc 70 affixed to the sleeve 22. The action of the spring 68 is to move the sleeve 22 and armature 64 to the left, urging the disc 28 into engagement with the projections 18 of the caliper fingers. A compression spring 72 is mounted within the housing 32 between the right-hand end of the spool 50 and a disc 74 attached to the extreme right-hand end of the rod 24 which passes through the armature 66. The action of the spring 72 is to urge the armature and the rod 24 to the right, as viewed in Figure 1, thereby urging the disc 30 into engagement with the projections 16 of the caliper fingers.

The force exerted by the spring 68 is somewhat greater than the force exerted by the spring 72. Thus the caliper fingers 4 are at all times urged to an outermost position as limited either by the stops 12 or by the engagement of the fingers with the wall of a tube being calipered. The force provided by the spring 72 is sufficient to maintain the disc 30 in engagement with the projection 16 of the caliper finger 4 which is in the outermost position.

It should be noted that the disc 30 being rigidly connected to the rod 24 will have its position established by the one of the projections 16 which is moved farthest to the left as viewed in Figure 1. In other words, the position of the armature 66 is determined by the caliper finger 4 which is in an outermost position. It is also noted that the disc 28 bears against a rounded end surface of the sleeve 22 and is free to wobble and thus the position of the disc 28 and the position of the armature 64 connected to the sleeve 22 will be determined by the three projections 18 of the caliper fingers which are in the right-handmost position as viewed in Figure 1. In other words, the position of the armature 64 is determined by the three caliper fingers which are in the innermost positions.

The left-hand end of the housing 2 mounts a swivel ring 76 which has a stem passing through a bushing 78 held in place within the housing 2 by means of a suitable set screw 80. By attaching a cable to the ring 76, the measuring head may be conveniently drawn through a tube which is to be calipered.

In the eletcrical circuit diagram of Figure 2 the coils 40, 42, 52 and 54 are shown electrically connected to the remainder of the circuit. The coils 40 and 42 are connected in bridge circuit in which the coil 40 forms one leg of the bridge and the coil 42 in series with a resistor 82 forms an adjoining leg of the bridge. The two opposite legs of the bridge are formed by resistors 84 and 86, respectively. An input terminal 88 of the bridge at the connection between the coils 40 and 42 is connected through a conductor 89 to one side of the secondary of the transformer 102. The opposite input terminals 100 of the bridge are connected through a conductor 101 to the opposite side of the secondary of the transformer 102. The primary of the transformer 102 is connected through a suitable disconnect switch 104 to a source of power. The transformer 102 serves to isolate the measuring circuit from the power line and to reduce the potential existing within the coils and the portable portion of the calipering apparatus. The output terminals of the bridge 106 and 108 are connected to the indicating circuit which will be hereinafter described.

The coils 52 and 54 of the indicating unit are similarly connected in bridge circuit in which the coil 52 forms one leg of the bridge and the coil 54 in series with the resistor 110 forms an adjacent leg of the bridge. The two opposite legs of the bridge are formed by resistors 112 and 114. The input terminal 116 of the bridge is connected through conductor 89 to the transformer 102 and the opposite input terminal 118 of the bridge is connected through conductor 101 to the opposite side of the transformer 102. The output terminals 120 and 122 of the bridge are connected to the indicator circuit which will be described.

The resistors shown in the bridge circuits may be variable although once the resistors have been set they will not normally be varied. It will be evident that movement of the armature 64 will vary the balance of the bridge circuit associated with the coils 40 and 42 and give rise to a potential variation across the output terminals 106 and 108. Similarly, movement of the armature 66 in the coils 52 and 54 will unbalance that bridge arrangement giving rise to a variation in the output potentials appearing across the terminals 120 and 122. The connections of the coils in the two bridge circuits are so arranged that the output of the bridge circuit including the coils 40 and 42 indicates minimum tube diameters and the output of the bridge including the coils 52 and 54 indicates maximum tube diameters.

The output terminal 106 of the minimum diameter responsive bridge is connected to a terminal 124 of a selector switch having a movable contact 126 and is also connected to one side of the input side of a transformer 128. The output terminal 108 of the minimum diameter responsive bridge is connected to a terminal 130 of a selector switch having a movable contact 132 and is also connected to a movable contact 134 of another selector switch. The movable contacts 134, 126 and 132 of the three selector switches are interlocked by conventional means as indicated at 136.

A volt meter 138 which is preferably a self-rectifying type of A. C. volt meter has one of its terminals connected through a variable resistor 140 to the movable contact 126. The other terminal of the volt meter 138 is connected to the movable contact 132. With the movable contacts in the positions shown in Fig. 2, the output contacts of the minimum diameter responsive bridge circuit are open and the connections to the volt meter 138 are open. When the movable contacts 134, 126 and 132 are moved to an upward position as viewed in Figure 2, the movable contact 134 is on an open circuited contact 142 and the movable contacts 126 and 132 serve to connect the output terminals 106 and 108 of the minimum diameter responsive bridge directly across the volt meter 138. With the movable contacts in this position, indications can be obtained of minimum diameter points within a tube being calibrated. However, with the meter thus connected, such indications are observed only with difficulty unless the measuring head is moved through the tube extremely slowly in order to give the volt meter time to respond to variations of tube diameter which are of very short axial length within the tube wall.

When the movable contacts 134, 126 and 132 are moved to a downward position, the contact 134 engages the terminal 144 connected to the opposite side of the input side of the transformer 128. Thus under these conditions the output terminal 106 of the bridge circuit is connected to one side of the input side of the transformer 128 and the output terminal 108 of the bridge circuit is connected to the other side of the input side of the transformer 128. The movable contact 126 is engaged with a terminal 146 and the movable contact 132 is engaged with a terminal 148, thereby connecting the volt meter 138 to the output of a circuit which will now be described.

The transformer 128 provides a voltage gain sufficient to increase the bridge circuit signal to a more useful level. One side of the output of transformer 128 is connected at terminal 129 between biasing resistors 151 and 153, the other sides of which are connected to a positive power supply line 131 and a ground line 139, respectively. The other side of the output of the transformer 128 is connected through a diode rectifier 150 to a cathode follower arrangement in the form of a triode 156 having a cathode resistor 158 having sufficient value to prevent grid cut-off at maximum signal levels. A filter circuit is desirably provided in the form of a resistor 152 connected between the grid of the cathode follower tube 156 and the terminal 129, and a capacitor 154 connected between the grid of the triode 156 and the ground line 139.

The cathode follower arrangement provides a low impedance D. C. output which is fed through a diode rectifier 160 to the grid of the left-hand side of a twin triode 162. The grid of the left-hand triode 162 is by-passed to ground by a capacitor 164 which is preferably a polystyrene type of capacitor selected to be capable of holding the maximum voltage impressed across it for several minutes without appreciable discharge. The input cathode follower provides the power to charge the capacitor 164 quickly while the high back resistance of the diode 160 prevents the capacitor from discharging. A reset switch 166 connected in parallel with the diode 160 is provided for discharging the capacitor before each measuring run of the measuring head is made.

The grid of the right-hand triode of the twin triode 162 is connected to the movable arm of a potentiometer indicated generally at 168 which is connected between the positive power line 131 and the ground line 139. The anodes of the twin triode 162 are connected to the positive line 131. The left-hand cathode of the twin triode is connected through resistor 170 to the ground line 139 and the right-hand cathode of the twin triode is connected through resistor 172 to the ground line 139. The left-hand cathode is also connected through a variable resistor 174 to the terminal 146 of the selector switch 126 and the right-hand cathode is also connected through a resistor 176 to the terminal 148 of the selector switch 132. Thus the volt meter 138 is connected to the cathodes of the twin triode 162 through the resistors 174 and 176 when the selector switches 126 and 132 are in a downward position as viewed in Figure 2. The resistor 174 sets the sensitivity of the volt meter to the output signal delivered by the left-hand triode of the twin 162 and by adjustment of the potentiometer 168 the output of the right-hand triode of the twin 162 is made to provide a suitable reference voltage. It will be evident that while the drawing shows a twin triode 162 individual triodes may be employed, however, having the two triodes in a single envelope minimizes the effect of drift.

It is believed that it will be evident from the foregoing that the signal delivered from the bridge circuit to the transformer, when the selector switches 134, 126 and 132 are in a downward position as viewed in Figure 2, is impressed on the capacitor 164 which, being of a type capable of holding an impressed voltage charge for several minutes, will maintain on the grid of the left-hand triode of the twin triode 162 an impressed potential equal to the maximum signal potential delivered to it. This signal is amplified through the left-hand side of the twin triode 162 and impressed along with the reference voltage delivered through the right-hand side of the triode 162 on the volt meter 138. As previously noted, the arrangement is such that minimum diameter conditions in the tube being calibrated moving the armature 64 through the three most depressed caliper fingers 4 will serve to deliver an increasing voltage to the left-hand grid of the twin triode 162 as the tube diameter decreases. Thus the meter 138 will read minimum diameter and as a result of the operation of the capacitor 164 will retain a reading of minimum diameter even after the measuring head has passed the minimum diameter point. This arrangement permits the rapid movement of the measuring head through the tube being calipered and, when a minimum diameter indication is obtained, then the selector switches 134, 126 and 132 may be moved to their uppermost position as viewed in Figure 3 whereupon the measuring head may be repassed through the portion of the tube giving rise to the diameter indication and, if the rate of movement of the measuring head is extremely slow, the exact location and extent of the minimum diameter region of the tube can be determined.

The output terminal 120 of the bridge including the maximum diameter indicating coils 52 and 54 is connected to a terminal 180 of a selector switch having an arm 182 and to one side of the input side of a transformer 184. The bridge output terminal 122 is connected to a terminal 186 of a selector switch having a movable arm 188 and is connected to the movable arm 190 of a selector switch. The selector switch arms 190, 182 and 186 are interlocked and interlocked with the movable arms of the selector switches 134, 126 and 132 through the interlock means indicated at 136.

The volt meter 192 similar to the volt meter 138 is conected in series with a variable resistor 194 and across the movable contact arms 182 and 188. When the selector switch arms 190, 182 and 188 are in an uppermost position as viewed in Figure 2, the volt meter 192 is connected directly across the output terminals of the bridge. The coils 152 and 154 and the volt meter 192 are so arranged that deflections of the meter 192 indicate maximum inside diameters of the tube being calipered. As previously described, the operation of the caliper fingers 4 and of the armature 66 in response thereto are such that the maximum diameter indication is provided by the position of the one most extended caliper finger.

When the selector switches 190, 182 and 188 are moved to a downwardmost position, as shown in Figure 2, the switch 190 will engage contact 196 connecting the output terminal 192 of the bridge to one side of the input side of the transformer 184. The output terminal 120 of the bridge is connected directly to the other side of the input side of the transformer 184. The movable contacts 182 and 188 will engage terminals 198 and 200, respectively, thus connecting the volt meter 192 directly across the output of a circuit which will now be described.

The circuit extending between the output side of the transformer 184 and contact points 198 and 200 is identical to that described in connection with the transformer 128 and includes a diode 202 and a filter circuit 204 through which the output signal from transformer 184 is fed to the grid of a triode 206 connected in cathode follower arrangement. The output is fed through a diode 208 to the grid of the left-hand triode of a twin triode 210. This grid is connected to a ground line 212 through a capacitor 214 which serves to hold the maximum voltage impressed upon the grid of the left-hand triode 210.

The grid of the right-hand side of the twin triode 210 is connected to the movable arm of the potentiometer 216 connected between the positive potential line 131 and the ground line 212. The left-hand grid of the twin triode 210 is connected through a variable resistor 218 to the terminal 198 of the selector switch 194 and the grid of the twin triode 210 is connected through resistor 220 to the terminal 200 of the selector switch 188. Thus, when the selector switches 182 and 188 are in the downward position as viewed in Figure 2, volt meter 192 is connected to the cathodes of the twin triode 210 and has impressed upon it the maximum output signal voltage and a fixed reference voltage. A reset switch 224 is connected across the diode 128 and provides for discharging the condenser 214 before each test run is made. The reset switches 166 and 224 are interlocked as indicated at 226 and thus, prior to each run of the measuring head through a tube to be calipered, these switches are closed for a sufficient length of time to discharge the condensers 164 and 214.

The measuring head is then drawn through a tube to be calipered and, if the selector switches 134, 126, 132, 190, 182 and 188 are in their downward position, the volt meters 138 and 192 will each initially provide an indication as determined by the setting of the resistors 174 and 218, respectively, and the initial positions of the armatures 64 and 66. The initial positions of these armatures when the sensing head is positioned within a particular tube can to some extent be adjusted by adjusting the relative positions of the housing 32 and the housing 2 by means of their threaded connection. This is, of course, only a limited adjustment. As the measuring head is drawn through the tube, movement of the sensing fingers in response to changes in tube diameter will give rise to indications of minimum and maximum diameters on the volt meters 138 and 192, respectively, which will be retained on the volt meters for a time duration depending upon the characteristics of the condensers 164 and 214 or until the reset switches are closed to discharge these condensers. When either of the meters 138 or 192 indicates a discontinuity in the tube being calipered, the measuring head may be repassed through the region of the tube containing the discontinuity and, if the selector switches 134, 126, 132, 190, 182 and 188 have been moved to the uppermost positions as viewed in the drawing, the meters 138 and 192 will indicate instantaneous values of minimum and maximum diameters.

What is claimed is:

1. A tube calipering device comprising sensing means adapted to enter the tube and responsive to inside diameters of the tube, and means including movable means responsive to the sensing means for indicating sensed inside diameters of the tube and means for delaying return movement of the indicating means after movement thereby to positions indicating variation in normal tube diameter and after the sensing means has moved past a region of variation of normal tube diameter giving rise to said movement of the indicating means.

2. A tube calipering device comprising sensing means adapted to enter the tube and responsive to inside diameters of the tube, and means including movable means responsive to the sensing means for indicating sensed inside diameters of the tube and means for delaying return movement of the indicating means after movement thereby to positions indicating increases in normal tube diameter and after the sensing means has moved past a region of increased normal tube diameter giving rise to said movement of the indicating means.

3. A tube calipering device comprising sensing means adapted to enter the tube and responsive to inside diameters of the tube, and means including movable means responsive to the sensing means for indicating sensed inside diameters of the tube and means for delaying return movement of the indicating means after movement thereby to positions indicating reductions in normal tube diameter and after the sensing means has moved past a region of reduced normal tube diameter giving rise to said movement of the indicating means.

4. A tube calipering device comprising a plurality of sensing means adapted to enter the tube and responsive to inside diameters of the tube, and means including movable means responsive to the sensing means for indicating maximum and minimum sensed inside diameters of the tube and means for delaying return movement of the indicating means after movement thereby to positions indicating variation in normal tube diameter and after the sensing means has moved past the region of variation of normal tube diameter giving rise to said movement of the indicating means.

5. A tube calipering device comprising at least three sensing means adapted to enter the tube and responsive to inside diameters of the tube, and means responsive to the three sensing means sensing minimum tube diameters for indicating minimum sensed inside diameters of the tube and holding said indication after the sensing means have moved past a sensed reduced inside diameter portion of the tube.

6. A tube calipering device comprising sensing means adapted to enter the tube and responsive to inside diameters of the tube, and means including movable means selectively responsive to the sensing means for either instantaneously indicating sensed changes in inside diameters of the tube or for instantaneously indicating changes from sensed normal inside diameter of the tube and for delaying return movement of the indicating means after movement thereby to positions indicating change in normal tube diameter and after the sensing means has passed the region of change from normal tube diameter.

7. A tube calipering device comprising a plurality of sensing means adapted to enter the tube and responsive to inside diameters of the tube, and means including movable means selectively responsive to the sensing means for either instantaneously indicating maximum and minimum sensed changes in inside diameters of the tube or for instantaneously indicating maximum and minimum inside diameter of the tube and for delaying return movement of the indicating means after movement thereby to positions indicating changes in maximum or minimum tube diameter and after the sensing means has passed the region of maximum or minimum tube diameter.

References Cited in the file of this patent
UNITED STATES PATENTS

| | | |
|---|---|---|
| 2,503,851 | Snow | Apr. 11, 1950 |
| 2,584,714 | Kirkpatrick | Feb. 5, 1952 |
| 2,695,456 | Roberts | Nov. 30, 1954 |